United States Patent
Neumann

(10) Patent No.: US 11,804,315 B2
(45) Date of Patent: Oct. 31, 2023

(54) EV CHARGING CABLE SYSTEM WITH COOLING

(71) Applicant: Prysmian S.p.A., Milan (IT)

(72) Inventor: Andreas Neumann, Mitwitz (DE)

(73) Assignee: Prysmian S.p.A., Milan (IT)

( * ) Notice: Subject to any disclaimer, the term of this patent is extended or adjusted under 35 U.S.C. 154(b) by 349 days.

(21) Appl. No.: 16/864,295

(22) Filed: May 1, 2020

(65) Prior Publication Data

US 2020/0350098 A1    Nov. 5, 2020

(30) Foreign Application Priority Data

May 1, 2019  (NL) ..................... 2023045

(51) Int. Cl.

| | |
|---|---|
| *H01B 9/00* | (2006.01) |
| *F16L 53/70* | (2018.01) |
| *H02J 7/00* | (2006.01) |
| *H01B 9/02* | (2006.01) |

(52) U.S. Cl.
CPC ............ *H01B 9/006* (2013.01); *F16L 53/70* (2018.01); *H02J 7/0045* (2013.01); *H01B 9/02* (2013.01)

(58) Field of Classification Search
None
See application file for complete search history.

(56) References Cited

U.S. PATENT DOCUMENTS

| | | | | | |
|---|---|---|---|---|---|
| 2,870,075 | A | * | 1/1959 | Leverett | G21C 19/02 376/268 |
| 3,943,965 | A | * | 3/1976 | Matelena | F17D 5/04 137/340 |
| 4,347,433 | A | * | 8/1982 | Wojtecki | F16L 53/32 219/535 |

(Continued)

FOREIGN PATENT DOCUMENTS

| | | | |
|---|---|---|---|
| CH | 716221 B1 * | 10/2022 | ............. B60L 53/16 |
| CN | 104091631 A * | 10/2014 | |

(Continued)

OTHER PUBLICATIONS

CN109036694A_Translate (Year: 2018).*

(Continued)

*Primary Examiner* — Timothy J. Dole
*Assistant Examiner* — Muhammed Azam
(74) *Attorney, Agent, or Firm* — Frost Brown Todd LLP

(57) ABSTRACT

A charging system for an electric energy storage includes a cable assembly and a plug transition between the cable assembly and the electric energy storage. The cable assembly includes a cable provided with at least two separate power conductors and at least one earth conductor. The power conductors are spaced apart from each other within the cable, with each surrounding at least one tube and including a plurality of intertwisted wires stranded around the tube. The cable assembly also includes at least two separate cooling circuits within the cable, namely a first cooling circuit having a cooling fluid in the tubes surrounded (Continued)

by the power conductors, and a second cooling circuit having a cooling fluid in auxiliary tubes to cool the plug transition. Systems and methods are also provided for charging an electrical energy storage on basis of such a cable assembly.

14 Claims, 6 Drawing Sheets

(56) References Cited

U.S. PATENT DOCUMENTS

| | | | | |
|---|---|---|---|---|
| 4,492,089 | A * | 1/1985 | Rohner | F16L 53/00 62/50.7 |
| 5,461,299 | A * | 10/1995 | Bruni | H02J 50/10 320/108 |
| 5,909,099 | A * | 6/1999 | Watanabe | B60L 53/18 320/108 |
| D549,645 | S * | 8/2007 | Prelec, Sr. | D13/108 |
| 7,358,701 | B2 * | 4/2008 | Field | B60L 53/62 320/155 |
| D628,960 | S * | 12/2010 | Shimizu | D13/107 |
| 7,973,516 | B2 * | 7/2011 | Flack | B60L 53/305 174/64 |
| 8,037,954 | B2 * | 10/2011 | Taguchi | B60L 15/007 165/10 |
| 8,118,147 | B2 * | 2/2012 | Ori | B60L 53/18 191/12.2 A |
| 8,174,235 | B2 * | 5/2012 | Dyer | B60L 58/26 320/109 |
| D664,088 | S * | 7/2012 | Chin-Ho Kim | D13/107 |
| 8,246,376 | B2 * | 8/2012 | Amit | B60L 53/18 439/456 |
| 8,344,692 | B2 * | 1/2013 | Sakurai | B60L 53/16 320/109 |
| 8,350,526 | B2 * | 1/2013 | Dyer | H01M 10/613 320/109 |
| D686,982 | S * | 7/2013 | Bianco | D13/107 |
| 8,686,290 | B2 * | 4/2014 | Orini | H02G 1/10 174/105 B |
| 8,895,851 | B2 * | 11/2014 | Maioli | H02G 9/10 174/34 |
| 8,912,889 | B2 * | 12/2014 | Sarchi | D07B 1/145 340/572.1 |
| 8,953,915 | B2 * | 2/2015 | Sarchi | H01B 7/32 385/101 |
| 8,974,478 | B2 * | 3/2015 | Ross | A61B 17/320068 606/169 |
| 8,987,599 | B2 * | 3/2015 | Reuss | H02G 3/0487 174/117 F |
| 9,032,809 | B2 * | 5/2015 | Kemnitz | G01L 1/242 73/800 |
| 9,073,446 | B2 * | 7/2015 | Hani | B60L 53/18 |
| 9,166,428 | B2 * | 10/2015 | Ono | B60L 50/61 |
| 9,213,158 | B2 * | 12/2015 | Consonni | G02B 6/441 |
| 9,318,257 | B2 * | 4/2016 | Lou | H02J 7/00034 |
| 9,372,069 | B2 * | 6/2016 | Knuepfer | G01B 11/02 |
| 9,384,885 | B2 * | 7/2016 | Karalis | B60L 53/126 |
| 9,586,497 | B2 * | 3/2017 | Epstein | B60L 53/11 |
| 9,658,418 | B2 * | 5/2017 | Ceschiat | G02B 6/4433 |
| 9,771,447 | B2 * | 9/2017 | Lamb | C08F 220/1811 |
| 9,786,961 | B2 * | 10/2017 | Dyer | H01M 10/6557 |
| 9,857,821 | B2 * | 1/2018 | Kurs | H02J 50/50 |
| 9,977,210 | B2 * | 5/2018 | Sutehall | G02B 6/4438 |
| 10,029,575 | B2 * | 7/2018 | Remisch | H01R 13/005 |
| 10,081,262 | B2 * | 9/2018 | Nagel | B60L 53/302 |
| 10,180,120 | B2 * | 1/2019 | McQuillen | F02D 41/222 |
| 10,222,798 | B1 * | 3/2019 | Brady | G06Q 10/0832 |
| 10,644,439 | B2 * | 5/2020 | Fuehrer | B60L 1/04 |
| 2010/0089669 | A1 * | 4/2010 | Taguchi | B60L 58/15 180/65.1 |
| 2011/0034053 | A1 * | 2/2011 | Matsumoto | B60L 53/305 439/304 |
| 2013/0069588 | A1 * | 3/2013 | Oda | B60L 53/11 320/109 |
| 2014/0008135 | A1 * | 1/2014 | Kinomura | B60L 53/30 180/65.1 |
| 2014/0292260 | A1 * | 10/2014 | Dyer | B60L 53/65 320/137 |
| 2015/0217654 | A1 * | 8/2015 | Woo | B60L 53/18 320/109 |
| 2016/0319982 | A1 * | 11/2016 | Lee | F16L 59/141 |
| 2017/0028862 | A1 * | 2/2017 | Nagel | B60L 53/18 |
| 2017/0297431 | A1 * | 10/2017 | Epstein | F02N 19/10 |
| 2017/0327091 | A1 * | 11/2017 | Capizzo | H02J 7/0013 |
| 2017/0338006 | A1 * | 11/2017 | Gontarz | H01B 7/423 |
| 2018/0158572 | A1 * | 6/2018 | Ernst | H01B 7/423 |
| 2018/0190410 | A1 * | 7/2018 | Cao | H01B 9/006 |
| 2018/0257501 | A1 * | 9/2018 | Hähre | B60L 53/57 |
| 2018/0304757 | A1 * | 10/2018 | Vaughan | B60L 53/305 |
| 2019/0036254 | A1 * | 1/2019 | Moseke | H01R 13/533 |
| 2019/0061543 | A1 * | 2/2019 | Jovet | B60L 53/31 |
| 2019/0069450 | A1 * | 2/2019 | Suzuki | H02M 7/537 |
| 2019/0131035 | A1 * | 5/2019 | Führer | B60L 53/14 |
| 2019/0217728 | A1 * | 7/2019 | Reber | B60L 53/18 |
| 2019/0237218 | A1 * | 8/2019 | Heyne | H01B 9/006 |
| 2019/0295743 | A1 * | 9/2019 | Sato | H01B 9/003 |
| 2019/0304628 | A1 * | 10/2019 | Neumann | H01B 7/366 |
| 2019/0385765 | A1 * | 12/2019 | Lyon | H01B 7/423 |
| 2020/0035382 | A1 * | 1/2020 | Sato | B60L 53/18 |
| 2020/0086751 | A1 * | 3/2020 | Heyne | H01B 9/006 |
| 2020/0303093 | A1 * | 9/2020 | Cantz | H01R 9/11 |

FOREIGN PATENT DOCUMENTS

| | | | | |
|---|---|---|---|---|
| CN | 106099241 A | * | 11/2016 | F28D 7/106 |
| CN | 106347166 A | * | 1/2017 | B60L 53/14 |
| CN | 106782835 A | * | 5/2017 | H01B 7/324 |
| CN | 206282636 U | * | 6/2017 | |
| CN | 206532637 U | * | 9/2017 | |
| CN | 206697276 U | | 12/2017 | |
| CN | 206697276 U | * | 12/2017 | |
| CN | 206711659 U | | 12/2017 | |
| CN | 206711659 U | * | 12/2017 | |
| CN | 206741986 U | * | 12/2017 | |
| CN | 206864231 U | * | 1/2018 | |
| CN | 107731396 A | * | 2/2018 | |
| CN | 207097480 U | * | 3/2018 | |
| CN | 207441310 U | * | 6/2018 | |
| CN | 108306135 A | * | 7/2018 | |
| CN | 108631090 A | * | 10/2018 | B60L 53/16 |
| CN | 108701513 A | * | 10/2018 | B60L 53/16 |
| CN | 208014413 U | * | 10/2018 | |
| CN | 108878014 A | * | 11/2018 | |
| CN | 108922658 A | * | 11/2018 | H01B 7/0045 |
| CN | 208093197 U | * | 11/2018 | |
| CN | 109036694 A | | 12/2018 | |
| CN | 109036694 A | * | 12/2018 | |
| CN | 109215872 A | * | 1/2019 | |
| CN | 109215873 A | * | 1/2019 | |
| CN | 208589277 U | * | 3/2019 | H01B 7/0045 |
| CN | 208753040 U | * | 4/2019 | |
| CN | 109768405 A | * | 5/2019 | |
| CN | 110010286 A | * | 7/2019 | |
| CN | 110048284 A | * | 7/2019 | B60L 53/16 |
| CN | 110120566 A | * | 8/2019 | |
| CN | 209962721 U | * | 1/2020 | |
| CN | 210805262 U | * | 6/2020 | |
| DE | 10322001 A1 | * | 12/2004 | G01J 1/04 |
| DE | 60316980 T2 | * | 7/2008 | |
| DE | 102015114133 A1 | * | 3/2017 | |
| DE | 102015120048 A1 | * | 5/2017 | B60L 11/1816 |
| DE | 202017102368 U1 | | 6/2017 | |
| DE | 102016107409 A1 | * | 10/2017 | B60L 1/04 |
| DE | 202015009531 U1 | * | 4/2018 | |
| DE | 102017213938 A1 | * | 10/2018 | B60L 53/11 |
| DE | 102017124028 A1 | * | 4/2019 | |
| DE | 102018125835 A1 | * | 4/2019 | |
| DE | 102018133590 A1 | * | 7/2019 | B60L 11/1818 |
| DE | 102018122680 B3 | * | 2/2020 | B60L 53/18 |
| EP | 2684733 A1 | * | 1/2014 | B60L 11/182 |

(56) References Cited

FOREIGN PATENT DOCUMENTS

| | | | | |
|---|---|---|---|---|
| EP | 3257700 | A1 * | 12/2017 | ............... B60L 50/60 |
| EP | 3330976 | A1 * | 6/2018 | ............... B60L 53/18 |
| EP | 3401955 | A1 * | 11/2018 | ............... B60L 53/16 |
| EP | 3734618 | A1 * | 11/2020 | ............... F16L 53/70 |
| ES | 2385013 | T3 * | 7/2012 | ............. F02M 26/17 |
| JP | 2000133058 | A * | 5/2000 | |
| JP | 2013099024 | A * | 5/2013 | |
| JP | 2017097965 | A * | 6/2017 | |
| JP | 2019187141 | A * | 10/2019 | |
| KR | 20140129630 | A * | 11/2014 | |
| KR | 20160119147 | A * | 10/2016 | |
| KR | 20180096259 | A * | 8/2018 | |
| KR | 20200074931 | A * | 6/2020 | |
| KR | 20220081965 | A * | 6/2022 | |
| WO | 2017133893 | A1 | 8/2017 | |
| WO | WO-2017188385 | A1 * | 11/2017 | ................ B60L 1/02 |
| WO | 2018021401 | A1 | 2/2018 | |
| WO | WO-2018060151 | A1 * | 4/2018 | |
| WO | 2018104234 | A1 | 6/2018 | |
| WO | 2018139335 | A1 | 8/2018 | |
| WO | WO-2018200552 | A1 * | 11/2018 | ............... B60L 1/003 |
| WO | WO-2019075151 | A1 * | 4/2019 | ............... B60L 53/16 |
| WO | WO-2021091216 | A1 * | 5/2021 | ............ B60L 53/302 |

OTHER PUBLICATIONS

CN-109036694-A_Original_Translated (Year: 2018).*
DE_102017213938_Original_Translated_Mohr (Year: 2018).*
CN-207416560_Original_Translated_Zhou (Year: 2018).*
CN-109754895_Orignial_Translated_Yu (Year: 2019).*
Alberti, Michele; Search Report and Written Opinion issued in Dutch Patent Application No. NL 2023045; dated Jan. 9, 2020. 10 pages including English translation of the Written Opinion.
Alberti, Michele; Extended European search report, including the European search report and the European search opinion, issued in European Patent Application No. 20172344.2; dated Aug. 10, 2020; 8 pages.

* cited by examiner

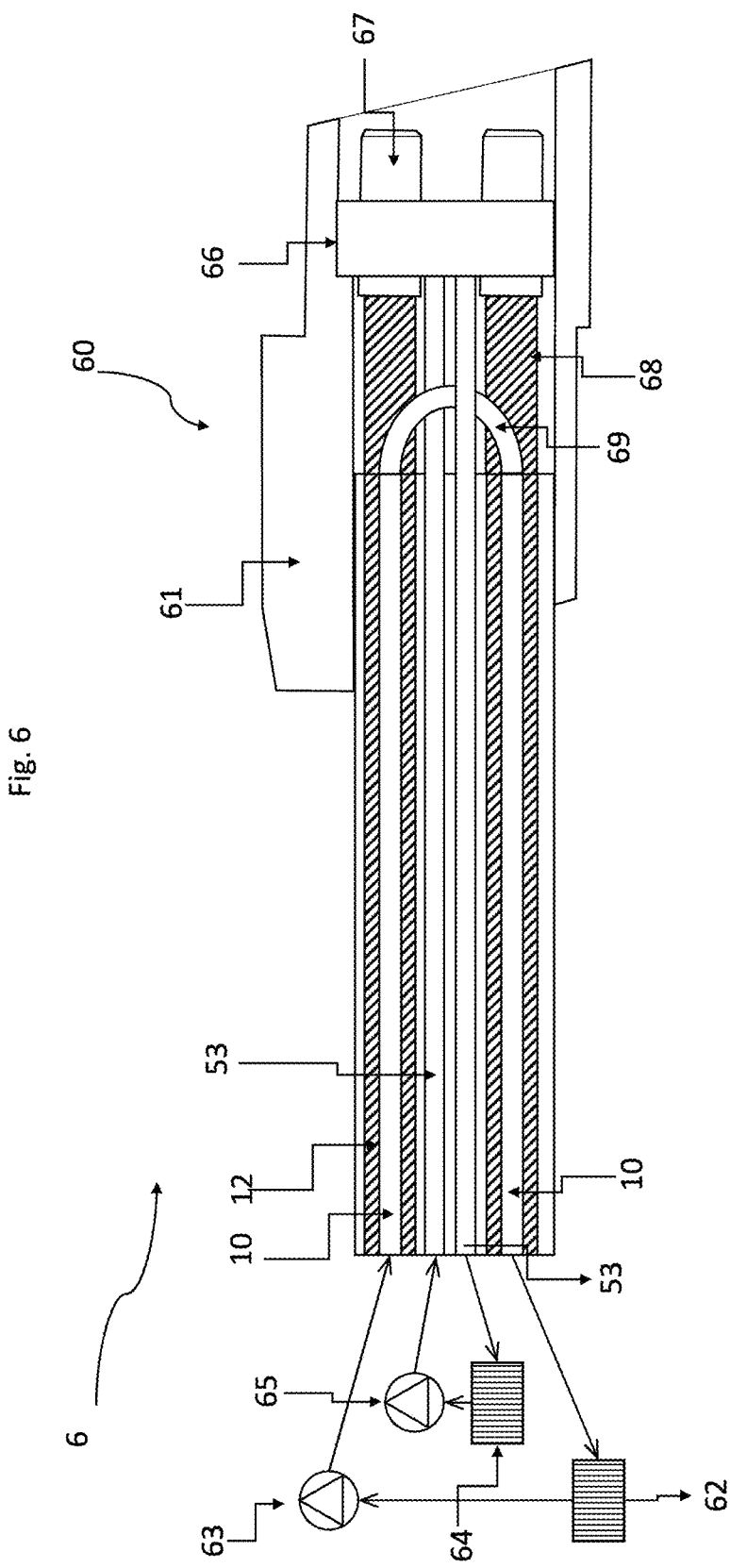

EV CHARGING CABLE SYSTEM WITH COOLING

RELATED FIELD

The present invention relates to a charging system for an electric energy storage comprising a cable charging assembly, a plug transition between the charging cable assembly and the electric energy storage. Such a cable assembly comprises a cable provided with at least two separate power conductors and at least one earth conductor. The present invention also relates to a method for charging an electrical energy storage on basis of such a cable assembly.

BACKGROUND

Cable assemblies as such are known. For example International application WO2018104234 relates to a high-current cable, in particular charging cable, comprising an outer sheath and a number of longitudinally extending transmission elements, each of these transmission elements having a core with a conductor and a core insulation and a first tube and wherein the core insulation and the first tube via a longitudinally extending connection connected to each other.

International application WO2017133893 relates to a cable assembly comprising a cable hose and at least one conductor arranged therein, wherein the cable hose is spaced a distance apart from the conductor forming a first interstitial space between the at least conductor and the cable hose. Such a cable assembly comprises at least one tube for conveying of a cooling fluid for cooling of the cable assembly. In addition the cable assembly comprises a connector comprising at least one contact member interconnected to the at least one conductor and a chamber wherein said chamber comprises a first port which is interconnected to the first interstitial space between the cable hose and the at least one conductor and a second port that is interconnected to the tube, such that cooling fluid may circulate from the tube, into the first interstitial space or vice versa.

German Gebrauchsmusterschrift DE 20 2017 102368 relates to a charging cable for electric vehicles with at least one conductor designed to conduct a high current of about 100 Ampere, which has an electrical conductor and a surrounding electrical insulation, and with a cooling channel, wherein the electrical conductor is a wire conductor made from individual wires and the insulation is an insulating tube for forming the cooling channel over the entire length of the line, wherein the wire conductor is immediately surrounded by a free space through which a fluid-like coolant can be conducted.

CN 109 036 694 relates to a cooling cable for a high-power charging connector, and includes a cable core and a protective layer wrapped around the cable core, the cable core is composed of two power wires, a ground wire, and a control wire wherein the gap between the cable cores is filled with a filler. The power wire includes a power conductor, a first cooling tube and an insulating layer, wherein the power conductor is wound around the first cooling tube, the insulating layer is wrapped on the power conductor. The grounding conductor includes a ground conductor, a second cooling tube and a shielding layer, wherein the ground conductor is wound on the second cooling tube, the shielding layer is wrapped around the ground wire conductor.

CN 206711659 relates to an electric vehicle charging cable with a cooling tube, including a power wire core, a ground wire core, a backup power line, a control signal wire core, and a strap. The charging cable is provided with a number of cooling tubes, the power line core has a built-in cooling tube, and the conductor of the power line core is tightly wrapped on the cooling tube. The ground wire core is also provided with a cooling tube, wherein the conductor of the grounding core is tightly wrapped on the cooling tube and the control signal core surrounds another cooling tube. Such a charging cable is connected to a charging gun.

CN206697276 relates to an electric vehicle high-current charging cable, comprising at least one wire, which is arranged in the cable, at least one first inflow pipe and one outflow pipe for transmitting cooling medium; the first inflow pipe passing through the wire, the first inflow tube is conductively connected to one end of the wire and one end of the outflow tube, and the outflow tube is arranged adjacent to the wire. Such an electric vehicle high-current charging cable further comprises an adapter, the adapter is provided with a through hole, and the first inflow pipe passes through the through hole and flows out.

WO2018021401 relates to a power supply cable which is used for power supply to an automobile, comprising: a plurality of electric wires being twisted together, each of which includes a cooling pipe having flexibility, an electric conductor surrounding the cooling pipe, the electric conductor is configured by winding a plurality of conductor wires around the cooling pipe, and an insulator surrounding the electric conductor; and a sheath that covers the plurality of the electric wires, wherein half the number of the cooling pipes is used as an outward path of a refrigerant, and the remaining half the number of the cooling pipes is used as a return path of the refrigerant.

SUMMARY

High current cable cables are designed to transmit high amounts electrical power in short time. When transmitting high currents relatively large amounts of heat are generated and a corresponding high-current cable heats up relatively quickly during operation. For most installations, high current cables are designed such that at the maximum rating (i.e. the maximum current carrying capacity), the temperature of the cable does not exceed about 90° C. to ensure that the insulation is not damaged. However in situations where people may come into contact with such cables the maximum temperature of the cable should be more limited to prevent injuries.

A typical example of these cables are so-called charging cables for electric storage in e.g. vehicles through which relatively high currents are conducted during a charging process and which at the same time have to be designed in such a way that they can be touched during charging without injury and to allow repeated manipulation of the cable for connecting and disconnecting to a vehicle.

During the charging cycle of for example electrical vehicles a temperature rise in conductor and plug transitions may occur due to the high currents being transmitted. This temperature rise may be reduced by limiting the currents, but the charging process will take a longer time.

The present invention therefore seeks to provide a high-current cable and a charging system for an electric energy storage.

The present invention also seeks to provide a method for charging an electrical energy storage on basis of such a high-current cable assembly.

The present invention thus relates to a charging system for an electric energy storage comprising a cable charging assembly, a plug transition between said charging cable assembly and said electric energy storage, said cable charging assembly comprising a cable provided with at least two separate power conductors and at least one earth conductor, wherein the at least two separate power conductors are spaced a distance apart from each other within said cable, each power conductor surrounds at least one tube, and each power conductor comprises a plurality of intertwisted wires stranded around said tube, wherein said cable charging assembly comprises at least two separate cooling circuits within said cable, namely a first cooling circuit comprising a cooling fluid in the tubes surrounded by the at least two power conductors and a second cooling circuit comprising a cooling fluid in auxiliary tubes to cool the plug transition.

On basis of such a construction a charging system for an electric energy storage is obtained that meets one or more of the mentioned objects.

In an embodiment of the present charging system the first cooling circuit comprises a cooling unit. During the charging cycle of for example electrical vehicles a temperature rise in the power conductor may occur due to the high currents being transmitted. This means that the cooling fluid or the cooling liquid in the first cooling circuit will take up the heat thus generated and that, due to the cooling circuit, the cooling fluid has to be cooled before it returns into the first cooling circuit. Such a cooling unit, including measuring and control systems, will cool the cooling fluid to a predetermined temperature and the cooling fluid thus cooled will be returned into the first cooling circuit.

In an embodiment of the present charging system the second cooling circuit comprises a cooling unit. During the charging cycle of for example electrical vehicles a temperature rise in the plug transitions may occur due to the high currents being transmitted. In order to prevent any damage to these plug transitions the second cooling circuit transports a cooling fluid or a cooling liquid to the plug transitions and the cooling fluid will take up the heat thus generated in the plug transitions. Such a cooling unit, including measuring and control systems, will cool the cooling fluid to a predetermined temperature and the cooling fluid thus cooled will be returned into the second cooling circuit.

In an embodiment of the present charging system the first cooling circuit and the second cooling circuit comprise a mutual cooling unit. Such a mutual cooling unit controls and regulates the temperature of the cooling fluid of both the first cooling circuit and the second cooling circuit.

In an embodiment of the present charging system the cooling fluids of both the first cooling circuit and the second cooling circuit are cooled in a mutual cooling unit including measuring and control systems. According to such an embodiment the cooling fluids that are returned are first mixed together and then the combined cooling fluid is cooled in a mutual cooling unit. The cooling fluid thus cooled is subsequently separated into a cooling fluid for the first cooling circuit and into a cooling fluid for the second cooling circuit.

In another embodiment of the present invention the at least one earth conductor surrounds said at least one auxiliary tube. Such a construction is beneficial for the dissipation of the heat generated by the plug transition.

In another embodiment of the present invention the cable is provided with two separate power conductors and two earth conductors, wherein the two separate power conductors each surround a tube for conveying of a cooling fluid and wherein the two earth conductors each surround an auxiliary tube for conveying of a cooling fluid.

Such a construction allows for an efficient heat transfer between each of the two power conductors and the cooling fluid. In an embodiment of the present invention the heated cooling fluid is transported through the tubes surrounded by the power conductors and can be transported back through the auxiliary tubes, or the auxiliary tubes are to be used for transporting a cooling fluid to and from a plug transition.

In another embodiment of the present invention each power conductor is surrounded by a sheath, said sheath being surrounded by an earth conductor. Such a concentric construction of the earth conductors around the power conductors allows for an efficient positioning of the elements present in the cable thereby reducing the overall diameter of the cable.

In another embodiment of the present invention the at least two separate power conductors are surrounded by a common sheath, said common sheath being surrounded by an earth conductor. Such a construction provides an alternative efficient positioning of the elements present in the cable thereby reducing the overall diameter of the cable.

In another embodiment of the present invention the cross sectional area of each power conductor is equal to or greater than the cross sectional area of each earth conductor.

In another embodiment of the present invention each earth conductor comprises a plurality of intertwisted wires. Such a construction allows for a repeated manipulation of the cable without damaging the cable.

In another embodiment of the present invention a tape wrapping is positioned between the tube for conveying of a cooling fluid and the power conductor. The tape wrapping adds an additional protection layer for the tube for conveying of a cooling fluid thereby minimizing the risk of damage to the tube for conveying of a cooling fluid when bending the final cable during practical use by the consumer. Such a tape wrapping may also be located at the outer circumference of the tube for conveying of a cooling fluid to cool the plug transition.

In another embodiment of the present invention a signal conductor is arranged within the cable in order to provide transmission of information along the cable.

The present invention furthermore relates to a cable assembly as discussed before wherein one or more auxiliary tubes for conveying of a cooling fluid are provided at interstices between the at least two separate power conductors.

The present invention furthermore relates to a charging system for an electric energy storage comprising a cable assembly as discussed before.

According to an embodiment of such a charging system the present charging system comprises a plug transition between the present charging cable assembly and the electric energy storage and comprises at least two separate cooling circuits, namely a first cooling circuit comprising a cooling fluid in the tubes surrounded by the at least two power conductors and a second cooling circuit comprising a cooling fluid to cool the plug transition.

The present invention furthermore relates to a method for charging an electrical energy storage comprising: a base station, a charging cable assembly connected with the base station and a plug transition between the charging cable assembly and the electric energy storage, wherein the charging cable assembly is provided with at least two separate power conductors, at least one earth conductor and at least two auxiliary tubes, wherein each power conductor surrounds a tube, wherein a first cooling fluid is pumped from the base station through the tubes surrounded by the at least two separate power conductors and wherein a second cooling fluid is pumped from the base station through the auxiliary tubes for cooling the plug transitions.

In a preferred embodiment of the present method the charging current is at least 350 Amps, preferably at least 500 Amps, more preferably at least 1000 Amps.

In a preferred embodiment the diameter of the charging cable assembly is 45 mm or less.

The cables and cable assemblies of the present invention can be used for any kind of electrical energy transport and allow to transport higher currents within the same cross sectional area of conductors, or cable diameter, when compared to conventional cables without cooling tubes.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 6 schematically shows a cable for a cable assembly according to the present invention in side view in section.

DETAILED DESCRIPTION OF THE INVENTION

The foregoing summary, as well as the following detailed description of the preferred embodiments, is better understood when read in conjunction with the appended drawings. For the purposes of illustrating the invention, an embodiment that is presently preferred, in which like numerals represent similar parts throughout the several views of the drawings The specific embodiments disclosed herein are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims.

Figure 1:
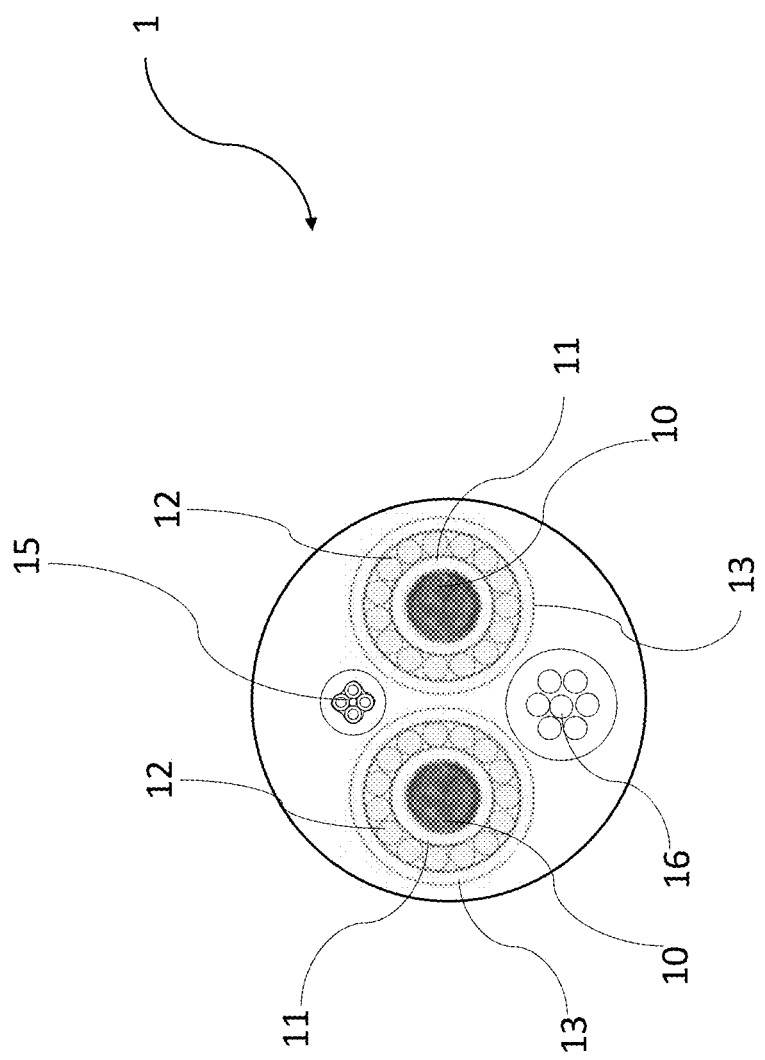
FIG. 1 schematically shows a first embodiment of a cable for a cable assembly according to the present invention in cross-section view.

FIG. 1 shows a first possible embodiment of a cable assembly 1 according to the invention. The cable assembly 1 comprises two separate power conductors and one earth conductor, wherein the two separate power conductors are spaced a distance apart from each other within the cable assembly. Cable assembly 1 comprises two tubes 10 that are arranged for conveying a cooling fluid along the cable assembly 1 and are arranged inside of cable assembly 1. Tube 10 has a wall 11. A power conductor 12 surrounds tube 10 for conveying of a cooling fluid. Each power conductor 12 comprises a plurality of intertwisted wires stranded around tube 10. The layer of wires is surrounded by a layer 13, e.g. a sheet or tube. For some applications, cable assembly 1 may comprise a transmission element 15 suited for the transmission of signals and/or information. The transmission element may comprise two or more signal conductors and/or optical fibers. Cable 1 is also provided with an earth conductor 16. One or more auxiliary tubes (not shown) may further be provided in the cable assembly of FIG. 1. Such auxiliary tubes may be used to covey a cooling fluid to and from plug transitions, or as return lines for cooling fluid supplied through the tubes 10 surrounded by the power conductors 12.

Figure 2:
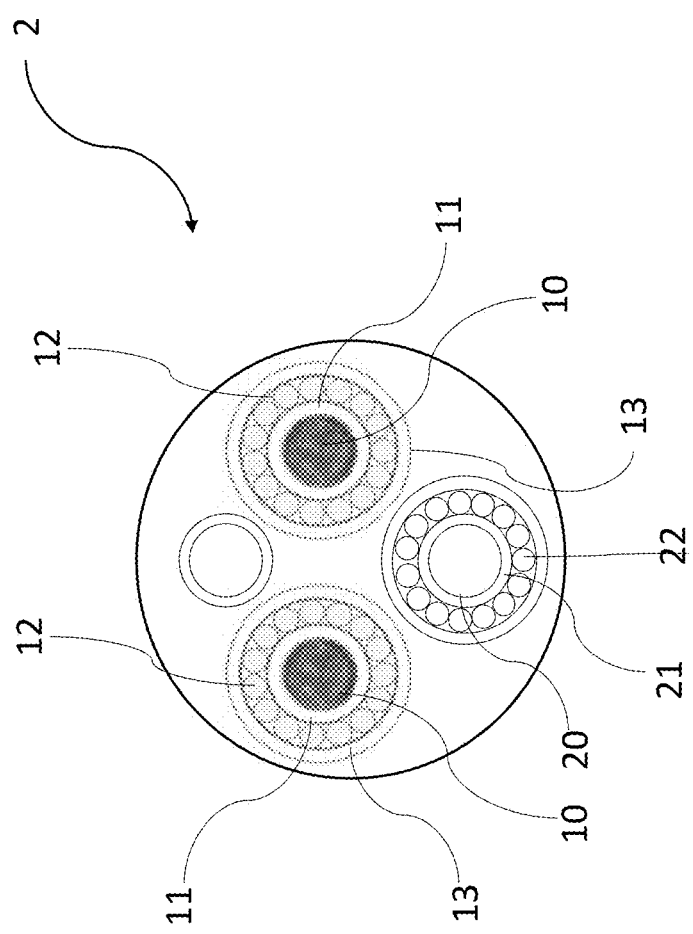
FIG. 2 schematically shows a second embodiment of a cable for a cable assembly according to the present invention in cross-section view.

FIG. 2 shows a second possible embodiment of a cable assembly 2 according to the invention. In this embodiment cable 2 further comprises an auxiliary tube 20 for conveying of a cooling fluid, wherein earth conductor 22 surrounds auxiliary tube 20. Auxiliary tube 20 has a wall 21. The cable assembly of this second possible embodiment may further optionally comprise one or more second auxiliary tubes that are not surrounded by a conductor. For some applications, cable assembly 2 may comprise one or more transmission elements suited for the transmission of signals and/or information. The transmission element may comprise two or more signal conductors and/or optical fibers.

Figure 3:
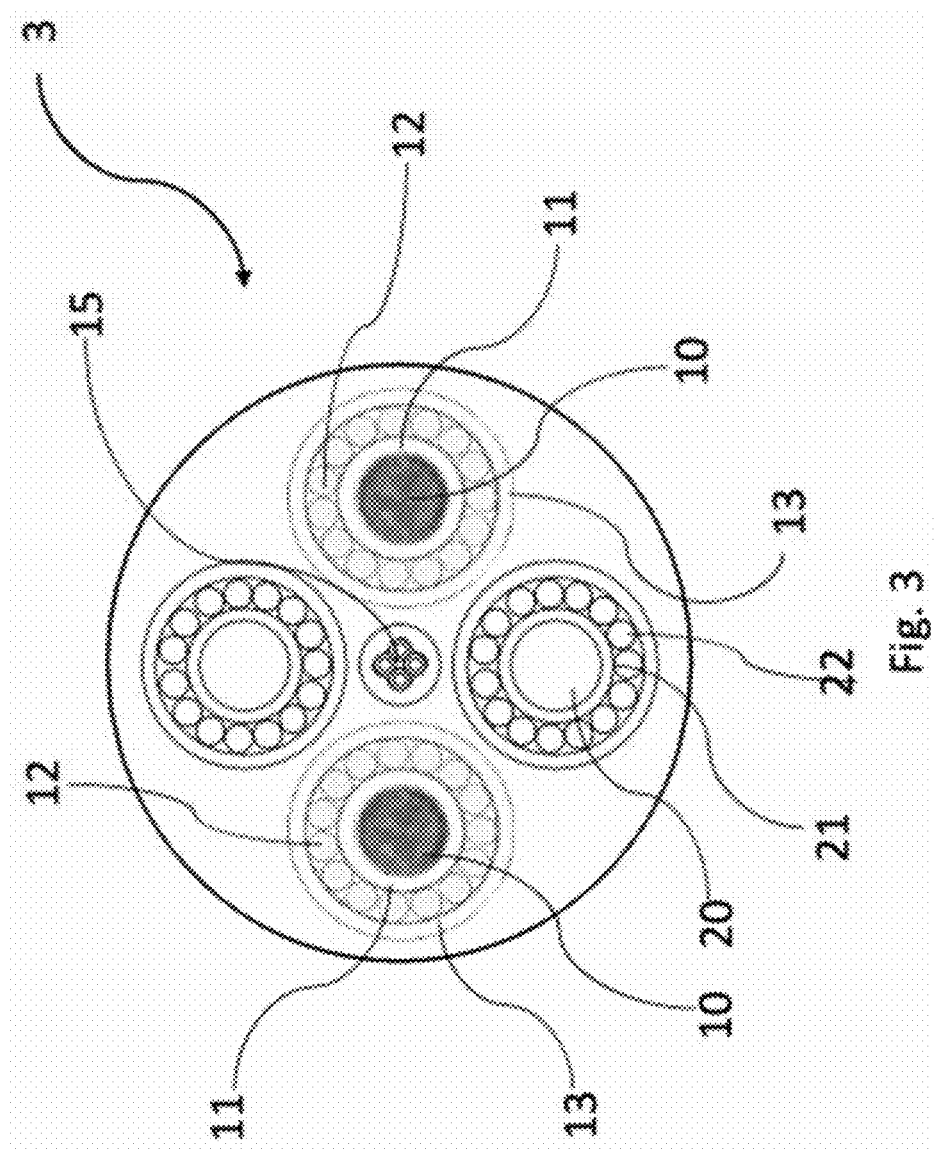
FIG. 3 schematically shows a third embodiment of a cable for a cable assembly according to the present invention in cross-section view.

FIG. 3 shows a third possible embodiment of a cable assembly 3 according to the invention. Cable 3 is provided with two separate power conductors and two earth conductors. There are two auxiliary tubes 20 for conveying of a cooling fluid, wherein each earth conductor 22 surrounds auxiliary tube 20. Auxiliary tube 20 has a wall 21. As illustrated in FIG. 3, each tube and each conductor (power or earth) may have equal cross sections. Such a construction allows for an easy installation and use of the cable assembly, because any connection of the two power and earth conductors will give a functioning system. Alternatively the embodiment of FIG. 3 allows to use the cable system as a three phase cable in which case one of the earth conductors is used as a power conductor. The cable assembly of this third possible embodiment may further optionally comprise one or more second auxiliary tubes that are not surrounded by a conductor.

Figure 4:
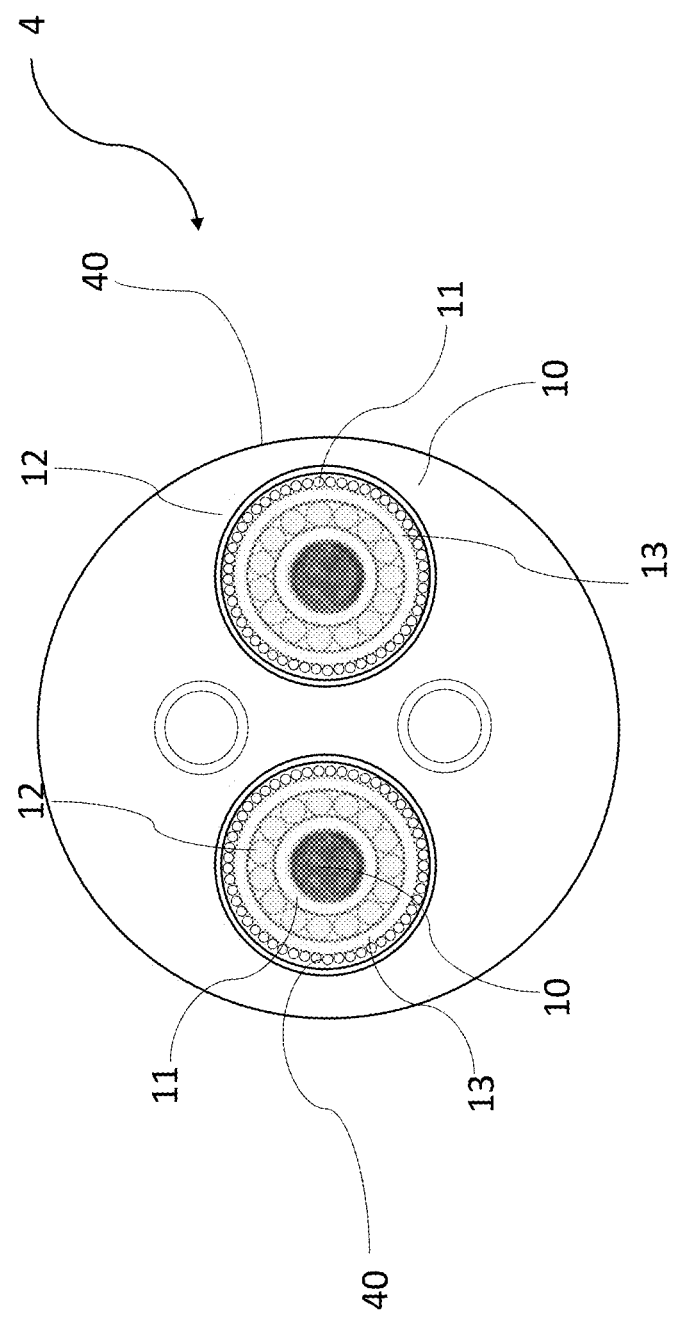
FIG. 4 schematically shows a fourth embodiment of a cable for a cable assembly according to the present invention in cross-section view.

FIG. 4 shows a fourth possible embodiment of a cable assembly 4 according to the invention. In this embodiment layer 13 is surrounded with an earth conductor 40. The cable assembly of this fourth possible embodiment may further optionally comprise one or more second auxiliary tubes that are not surrounded by a conductor.

Figure 5:
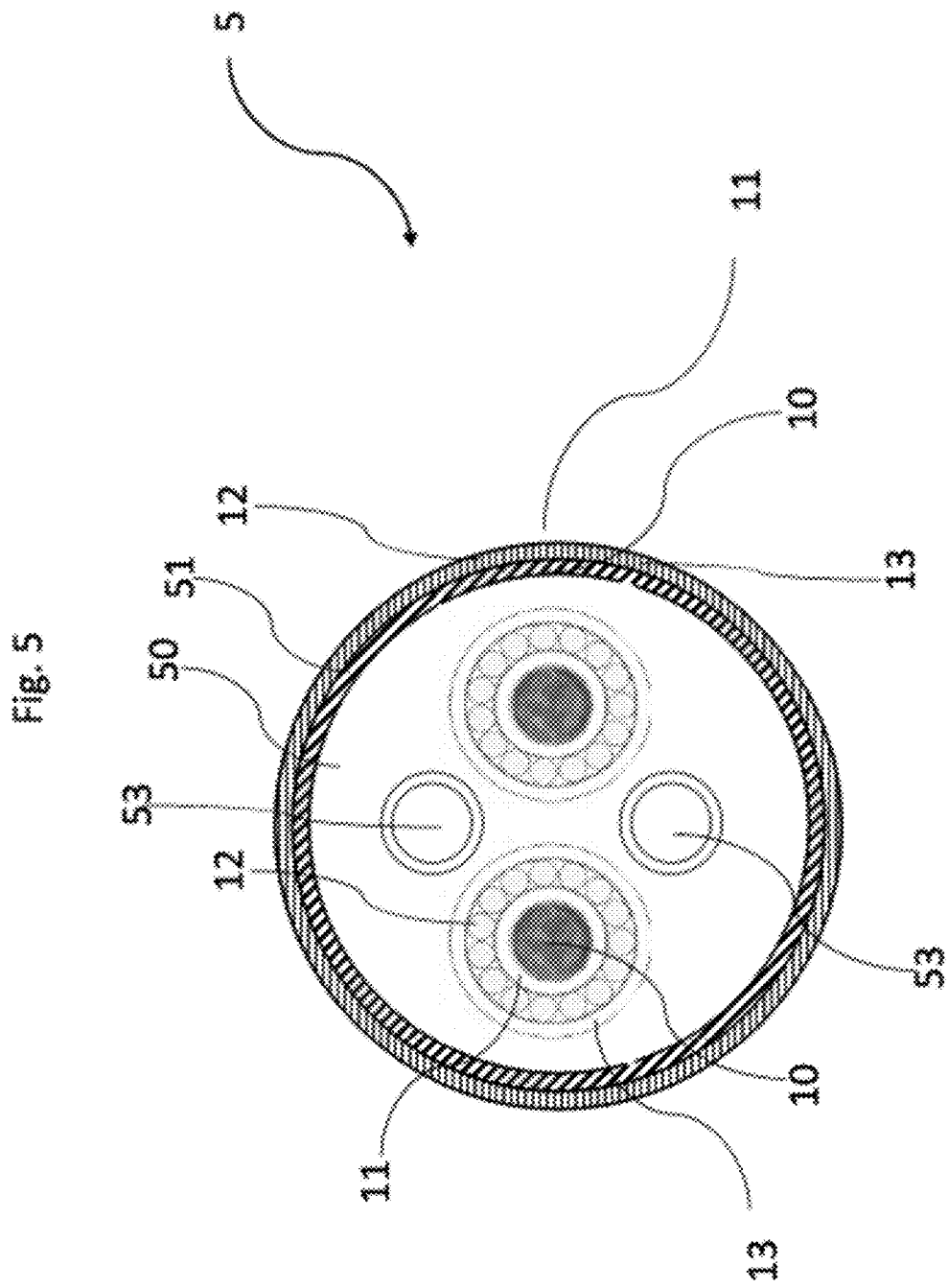
FIG. 5 schematically shows a fifth embodiment of a cable for a cable assembly according to the present invention in cross-section view.

FIG. 5 shows a fifth possible embodiment of a cable assembly 5 according to the invention. In this embodiment the two separate power conductors are surrounded by and embedded in a common sheath 50, wherein the common sheath 50 is surrounded by an earth conductor 51 which is surrounded by an outer sheath. Auxiliary tubes 53 are located within cable assembly 5 and these tubes 53 are used for conveying of a cooling fluid.

FIG. 6 schematically shows a cable for a charging cable assembly for charging an electrical energy storage in side view in section, i.e. a base station (not shown here), a charging cable assembly 6 connected with the base station and a connector assembly 60. Charging cable assembly 6 is provided with at least two separate power conductors 12, at least one earth conductor (not shown here) and at least two auxiliary tubes 53. Each power conductor 12 surrounds a tube 10, wherein a first cooling fluid is pumped from the base station through tubes 10 surrounded by separate power conductors 12 and wherein a second cooling fluid is pumped from the base station through auxiliary tubes 53 for cooling plug transitions 67. The connector assembly 60 surrounds an end of the charging cable assembly 6 and comprises a connector shelf, plug transitions 67, cooling blocks 66, conductor leads 68 and tube connector 69. Plug transitions 67 are surrounded by the connector shell 61 which includes one or more cooling blocks 66 in thermal conductive contact with the plug transitions 67. Auxiliary tubes 53 are connected to cooling blocks 66. The cooling fluid flowing through auxiliary tubes 53 into cooling blocks 66, i.e. the second cooling circuit, will take up the heat generated at the plug transition 67. The cooling fluid thus heated will be transported to a cooling unit 64 and returned, via a pump 65, to auxiliary tubes 53. Conductor leads 68 provide electrical connection between the power conductors 12 and plug transitions 67 and may consist of power conductors stripped and dismantled from the cable assembly end, or may be a separate part between each power conductor 12 and respective plug transition 67. Tube connector 69 provides a fluid connection between tubes 10 within the connector assembly. The first cooling circuit comprising tubes 10, tube connector 69, cooling unit 62 and pump 63 is used for cooling separate power conductors 12. Tubes 10 are surrounded by power conductors 12. The second cooling circuit comprising auxiliary tubes 53, cooling blocks 66, cooling unit 64 and pump 65 is used for cooling plug transition 67. Although not shown in FIG. 6, auxiliary tubes 53 may be surrounded by an earth conductor. In FIG. 6 two cooling units 62, 64 are shown but in a specific embodiment only one single cooling unit is used. Such a single cooling unit may include separate cooling circuits for cooling power conductors and plug transition, or such a mutual cooling unit may be used wherein the cooling fluids of the first cooling circuit and the second cooling circuit are cooled in such a mutual cooling unit.

The embodiments shown in FIGS. 2-6 may further comprise one or more transmission elements 15 suited for the transmission of signals and/or information. Such a transmission element 15 may comprise two or more signal conductors and/or optical fibers. (Not shown in FIGS. 2, 4, 5 and 6).

The earth conductors of the embodiments shown herein preferably comprise a plurality of intertwisted wires. Alternatively the earth conductors may be provided as a braid or metal foil.

What is claimed is:

1. A charging system for an electric energy storage comprising a charging cable assembly, a plug transition between said charging cable assembly and said electric energy storage, said charging cable assembly comprising a cable provided with at least two separate power conductors, at least one sheath, and at least one earth conductor, each of the at least one sheath being surrounded by one of the at least one earth conductor, wherein the at least two separate power conductors are spaced a distance apart from each other within said cable, each of the at least two separate power conductors surrounds at least one tube, and the each of the at least two separate power conductors comprises a plurality of intertwisted wires stranded around said at least one tube, wherein said charging cable assembly comprises at least two separate cooling circuits within said cable, namely a first cooling circuit comprising a cooling fluid in the at least one tube surrounded by the at least two power conductors and a second cooling circuit comprising a cooling fluid in at least one auxiliary tube configured to cool the plug transition.

2. The charging system according to claim 1, wherein the each of the at least two separate power conductors is surrounded by one of the at least one sheath.

3. The charging system according to claim 1, wherein the at least one sheath is a common sheath, wherein said at least two separate power conductors are surrounded by the common sheath.

4. A charging system for an electric energy storage, the charging system comprising:
a charging cable assembly comprising a cable, the cable comprising:
a first cooling circuit comprising a first tube and a second tube;
a first power conductor comprising a first plurality of intertwisted wires stranded at least partially around the first tube, wherein the first tube is configured to convey cooling fluid for cooling of the first power conductor;
a second power conductor spaced laterally from the first power conductor and comprising a second plurality of intertwisted wires stranded at least partially around the second tube, wherein the second tube is configured to convey cooling fluid for cooling of the second power conductor;
a second cooling circuit separate from the first cooling circuit and comprising an auxiliary tube spaced laterally from each of the first power conductor and the second power conductor; and
an earth conductor; and
a plug transition coupling the charging cable assembly and the electric energy storage, wherein the auxiliary tube is configured to convey cooling fluid for cooling of the plug transition.

5. The charging system according to claim 4, wherein said first cooling circuit is configured for cooling the first and second power conductors and comprises a tube connector, a cooling unit and a pump, wherein at least one of the first tube and second tube is surrounded by said at least two separate power conductors.

6. The charging system according to claim 4, wherein said second cooling circuit comprises a cooling block, the cooling block connected to the auxiliary tube and in thermal conductive contact with the plug transition.

7. The charging system according to claim 6, wherein said second cooling circuit further comprises a cooling unit and a pump.

8. The charging system according to claim 4, wherein said first cooling circuit and said second cooling circuit comprise a mutual cooling unit.

9. The charging system according to claim 4, wherein the cooling fluids of said first cooling circuit and said second cooling circuit are cooled in a mutual cooling unit.

10. The charging system according to claim 4, wherein said earth conductor surrounds said auxiliary tube.

11. The charging system according to claim 4, wherein the cross sectional area of the first and second power conductors is equal to or greater than the cross sectional area of the earth conductor.

12. The charging system according to claim 4, further comprising a signal conductor arranged inside of said cable and configured to provide transmission of information along said cable.

13. The charging system according to claim 4, wherein said auxiliary tube is provided at interstices between the first and second power conductors.

14. The charging system according to claim 4, wherein a diameter of the charging cable assembly is 45 mm or less.

* * * * *